United States Patent [19]

Cross, Jr. et al.

[11] Patent Number: 4,744,714

[45] Date of Patent: May 17, 1988

[54] BIN VIBRATING DISCHARGE DEVICE FOR SURGE OR BLENDING BINS OR THE LIKE

[75] Inventors: Wiley E. Cross, Jr., Glen Allen; Thomas E. Fahed; David E. Wilsoxson, both of Richmond, all of Va.

[73] Assignee: The Cardwell Machine Company, Richmond, Va.

[21] Appl. No.: 19,602

[22] Filed: Feb. 26, 1987

[51] Int. Cl.⁴ ............................................. B65G 65/42
[52] U.S. Cl. ........................... 414/304; 198/533; 198/631; 198/850; 222/197; 222/199; 222/200; 222/415; 414/156; 414/211
[58] Field of Search ............... 414/287, 288, 304, 307, 414/308, 311, 325, 326, 156, 209, 211, 357, 393, 266, 133; 198/533, 631, 850, 853; 222/197, 199, 200, 415

[56] References Cited

U.S. PATENT DOCUMENTS

| | | | |
|---|---|---|---|
| 3,191,756 | 6/1965 | Paurat | 198/533 |
| 3,788,455 | 1/1974 | Dieckmann, Jr. | 198/850 X |
| 3,807,548 | 4/1974 | Bergeron | 198/850 |

FOREIGN PATENT DOCUMENTS

| | | | |
|---|---|---|---|
| 2505202 | 8/1975 | Fed. Rep. of Germany | 198/770 |
| 1401446 | 7/1975 | United Kingdom | 222/200 |
| 931617 | 5/1982 | U.S.S.R. | 414/304 |

Primary Examiner—Frank E. Werner
Attorney, Agent, or Firm—Mason, Fenwick & Lawrence

[57] ABSTRACT

A vibrating discharge apparatus for discharging particulate stored material from a surge or blending bin or the like, having a discharge end, a discharge apron defining an support surface near the bottom of the bin extending in a substantially horizontal plane along a conveyance path to the discharge end. The apron is directed along a downwardly curving convex apron path sloping downwardly from the horizontal plane at the discharge end and comprises a plurality of rigid elongated parallel transversely extending slat members each having a main slat body portion and a thin plate-like lip projecting therefrom to overlie the adjacent slat member. A driven chain at opposite lateral ends of the slats are trained about sprockets for moving the slat members and an eccentric rotatable impact mechanism engages an under-side portion of successive slat members as they reach the beginning of the curving apron path to transfer vibratory movement thereto and has multiple adjustments to vary properties of the vibratory action.

21 Claims, 4 Drawing Sheets

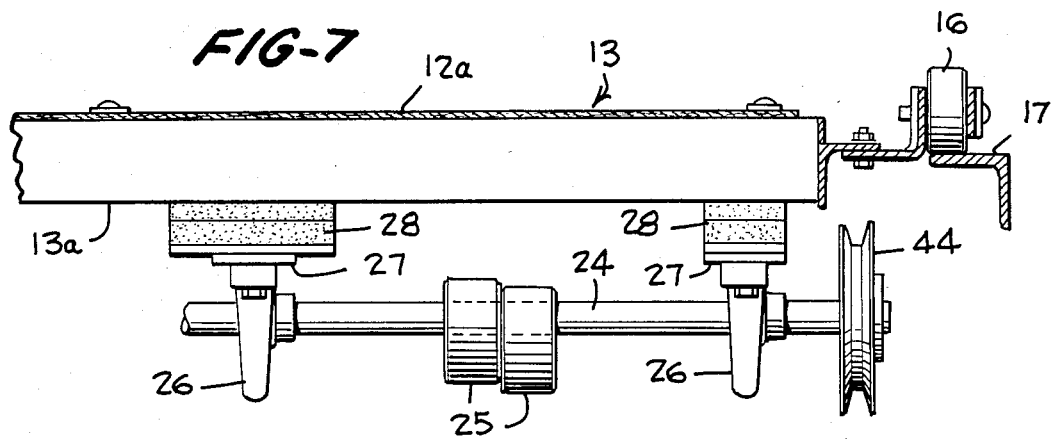
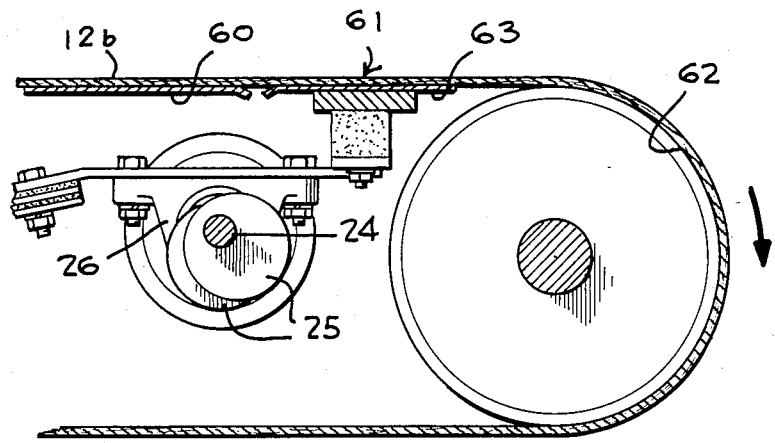
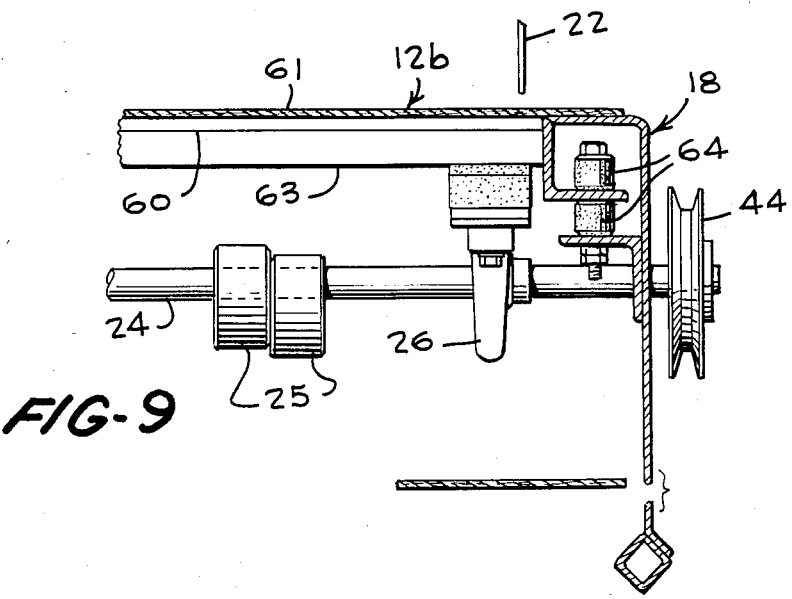

BIN VIBRATING DISCHARGE DEVICE FOR SURGE OR BLENDING BINS OR THE LIKE

BACKGROUND AND OBJECTS OF THE INVENTION

The present invention relates in general to a bin vibrating discharge device for surge or blending bins or the like wherein an apron type conveyor formed of a series of chain supported slats or the like or a belt supported by a fixed bed conveys product to a discharge zone where vibration is imparted to the apron to effect gentle continuous discharge of material therefrom in a steady and even fashion.

Relatively slow moving conveyors are used in many industries handling a bulk product to blend their product or as a surge point to accommodate the fluctuations in production rates which occur upstream and downstream of the surge point.

These surge bins or blending bins are usually of large cross section in relation to the rate at which the stored product is discharged, so some means of producing an even discharge must be employed. Current practice uses rollers with readily projecting tines, chain supported or cam supported pin bars, and round or flat bars to dislodge a small quantity at a continuous or nearly continuous rate. Attempts have been made to vibrate the entire end of the storage bin by making the last few feet of the entire storage area of vibrating conveyor.

One of the common means of conveying the stored product to a discharge zone and discharging it is to provide an apron trained about rollers, with the bulk material arranged in a pile on the apron. If unsupported, the face of the pile of bulk material resting on the apron will slope downward at the discharge end at an angle equal to the angle of repose of the particular material. When the apron moves toward the discharge, the face of material moves with it and is relatively undisturbed by the slow motion of the apron. If the apron is of the chain supported slat type providing a series of transversely elongated slats defining the apron surface, when a slat after becoming tangent to the sprocket pitch line, or after a belt becomes tangent to the head roller if a sliding belt trained around rollers is used, the slat or belt surface assumes a rather sudden downward slope which causes a slice of material roughly the thickness of the slat to break away at one time and fall into the discharge. The material ceases to discharge until the next slat approaches the pitch line. The same action to a lesser degree is present with the belt apron and in both cases some means must be provided to cause the material to flow down the face of the pile in an even and continuous manner.

Most of the present devices used to control the bin discharge cause an agitation on the face of the pile by successively passing a pin or bar along and through the material in the face so that it rolls down the face and then in the take-away conveyor. Introduction of this foreign pin into the material causes breakage and results in additional reduction in material size which is undesirable. Introduction of a vibrating section above and at the discharge end of the apron results in a large unbalanced vibrating mass which is nearly impossible to isolate. Excess breakage more than the pinned discharge is caused by the transfer from the apron to vibrating section. The present invention is directed to an improved method of causing an even and continuous discharge of the surge bin or blending bin with reduced breakage of product by using a selective vibration device which can be adjusted for frequencies, position, preload and strength of vibration depending on the characteristics of the product stored. The present invention prevents the degradation produced by introducing a foreign object such as a tine or blade into the product. An object of the present invention, therefore, is the provision of an improved vibrating discharge structure for discharging a product from a surge bin or blending bin or the like in a manner causing an even and continuous discharge with reduced breakage of the product, wherein the vibration can be adjusted for frequencies, position, preload and strength of vibration depending on the characteristics of the product.

Another object of the present invention is the provision of a novel vibrating discharge structure for bins as defined in the immediately preceding paragraph, wherein a series of chain supported slats which either overlap or butt against one another provide the apron and vibration is imparted to individual slats as they approach the discharge zone at the discharge end of the apron to effect a gentle but continuous discharge of material from the face of the pile of material on the apron in a steady or even fashion. Alternatively, the apron may be similar to that described above but the slats are not close fitting and are covered by a light belt or membrane to prevent leakage, or the slat type apron may be displaced by an apron in the form of a belt supported by a packed bed over which the belt slides in the zone between rollers at opposite ends of the belt.

Other objects, advantages and capabilities of the present invention will become apparent from the following detailed description, taken in conjunction with the accompanying Figures illustrating a preferred embodiment of the invention.

BRIEF DESCRIPTION OF THE FIGURES

FIG. 7 is a fragmentary section view thereof taken along the lines 7—7 of FIG. 6;

FIG. 8 is a fragmentary section view similar to FIG. 6 showing the eccentric supporting shaft and discharge end roller and discharge end portion of an alternative apron structure; and FIG. 9 is a fragmentary transverse section view taken along the line 9—9 of FIG. 8.

DETAILED DESCRIPTION OF A PREFERRED EMBODIMENT

Figure 1:
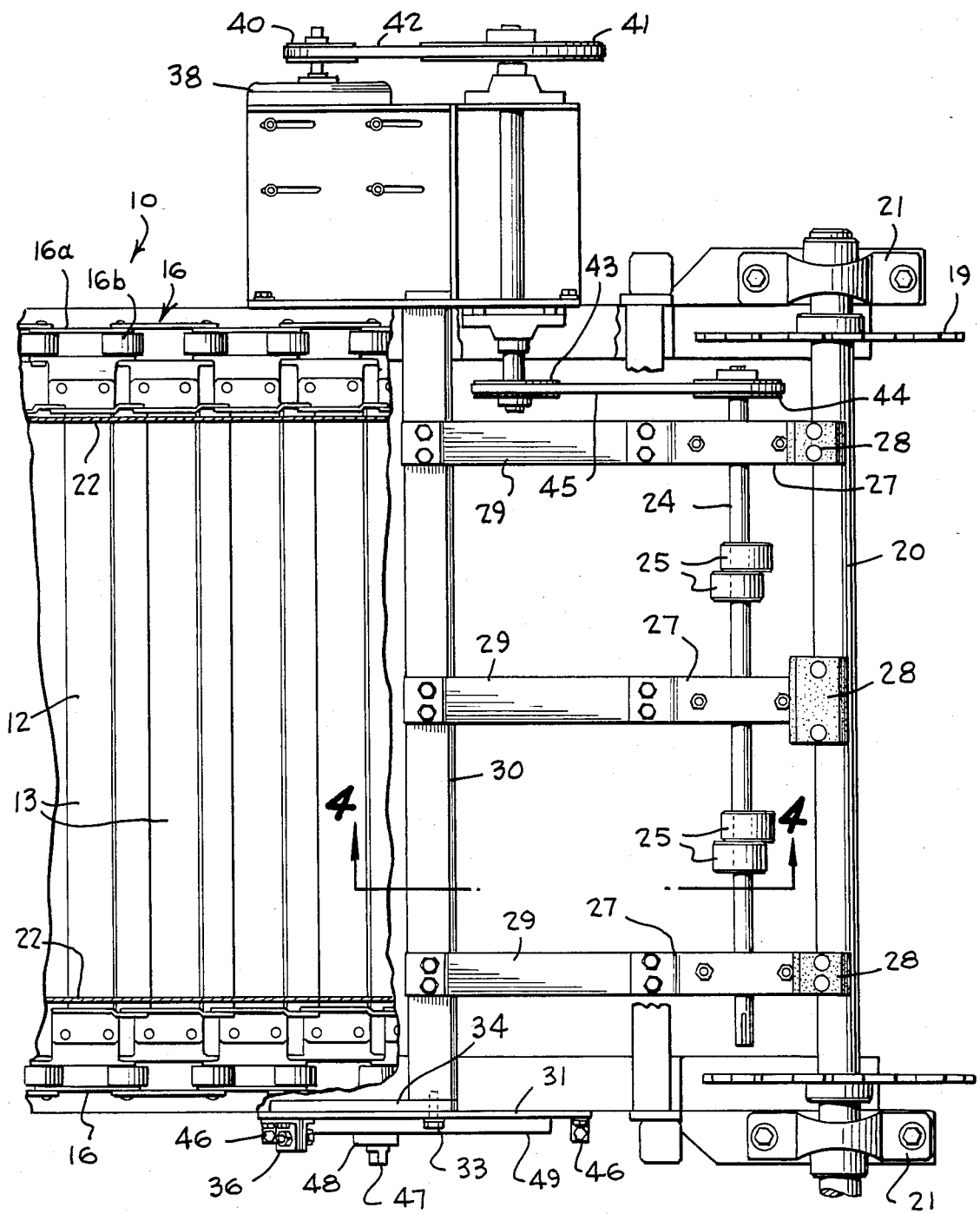
FIG. 1 is a fragmentary plan view of the bin having an apron in the form of a tight fitting or overlapping chain supported slat apron and an associated vibrating discharge structure, embodying the present invention.
Figure 2:
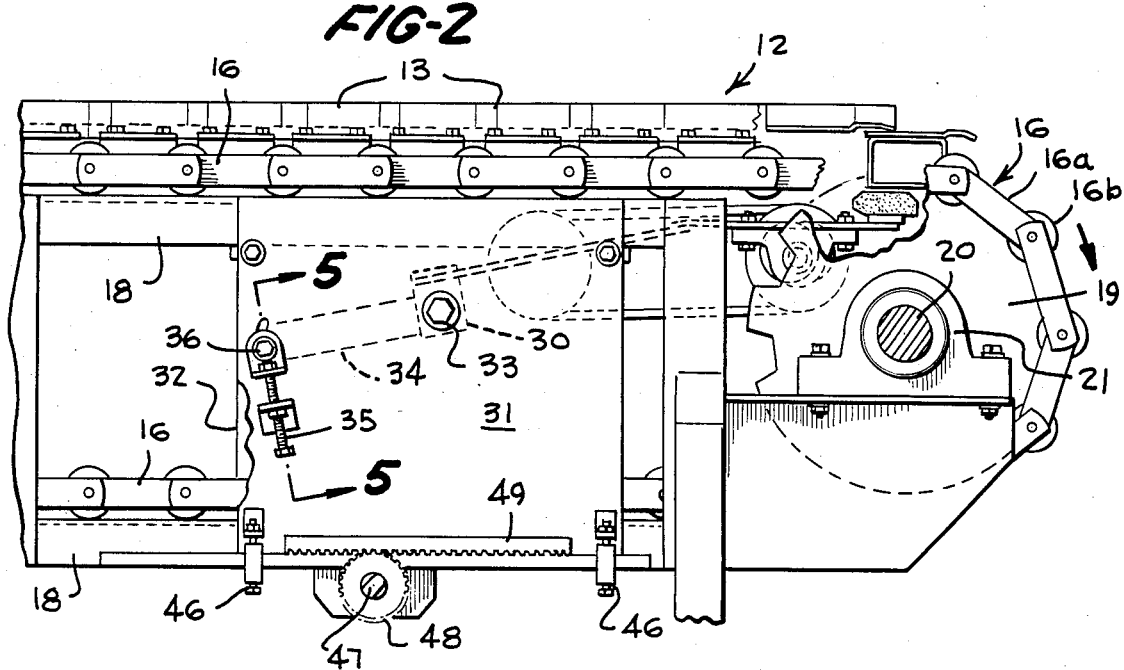
FIG. 2 is a side elevational view of the structure shown in FIG. 1.
Figure 4:
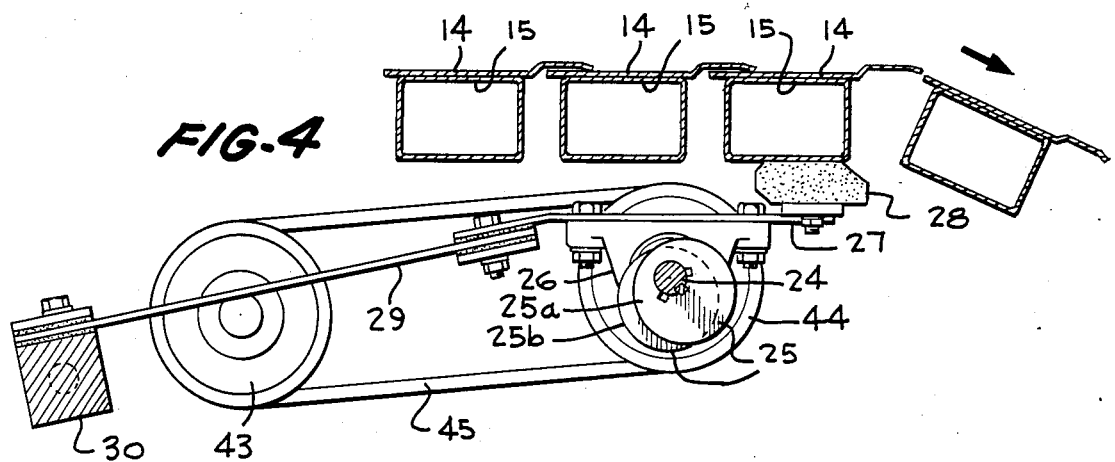
FIG. 4 is an enlarged fragmentary section view taken along the line 4—4 of FIG. 1.
Figure 3:
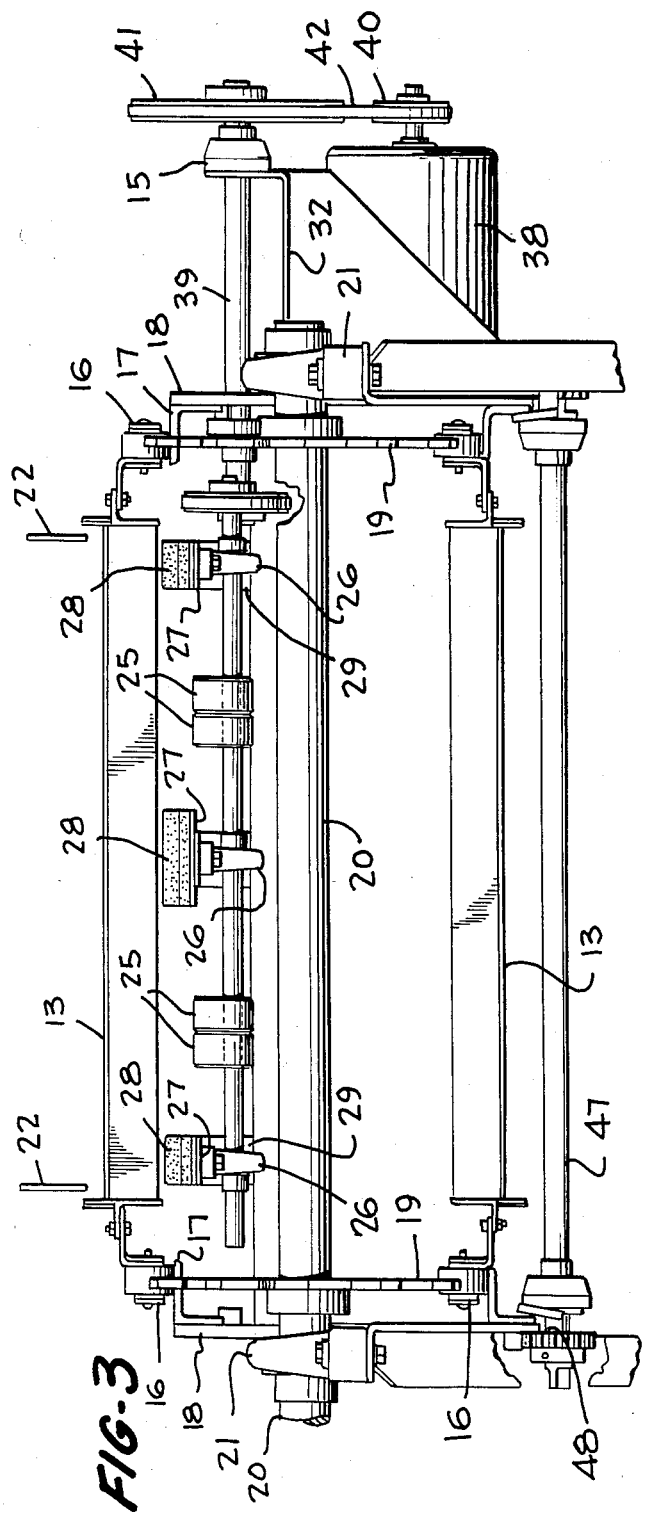
FIG. 3 is an end elevational view of the discharge end of the vibrating discharge structure with only adjacent parts of the bin being shown.

Referring to the drawings wherein like reference character designate corresponding posts throughout the several figures, and particularly shown in FIGS. 1–5, there is illustrated in FIG. 1 a fragmentary plan view of the discharge end portion of a surge bin or blending bin or the like, indicated generally by the reference character 10, having the bin vibrating discharge device 11 of the present invention associated therein, wherein the bin vibrating discharge device 11 is of the type of having a tight fitting or overlapping chain supported slat apron. The apron is indicated generally by the reference character 12 similar to an endless belt conveyor, but formed of a plurality of overlapping chain supported slats 13 which in the illustrated embodiment is formed of a thin plate-like slat panel 14 fixed in any suitable manner to a box-like hollow tubular supporting and rigidifying member 15 which underlies the slat panel portion 14 in the upper flight portions of the apron. The apron slats 13 are supported by side chains 16, which in the illustrated embodiment have links 16a with rollers 16b associated with opposite end portions of the links and rolling on beam or track formations 17 of the bin 18. The side chains 16 therefore are supported by the bin frame 18 and by chain sprockets 19 provided at both ends of the apron 13. The chain sprockets 19 at the discharge end are illustrated in FIGS. 1, 2 and 3 and are carried on a shaft 20 journalled in bearings 21 mounted on the bin. Similar chain sprockets are provided at the opposite end of the apron from that shown in FIGS. 1 and 2, normally serving as idle sprockets, while the discharge end sprockets 19 shown in FIGS. 1–3 are driven by a suitable driving arrangement coupled to the shaft 20.

Stored material rests atop the upwardly facing slat panel portions 14 of the slats 13 and against side walls 22 supported, for example, from the bin structure, and the faces of the apron slats toward the discharge end generally slope downwardly at the normal angle of repose of the stored material.

Figure 5:
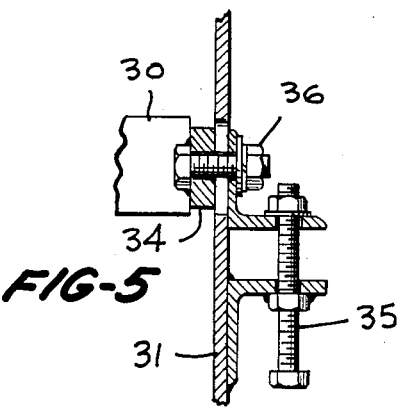
FIG. 5 is a fragmentary vertical section view through the adjustment mechanism, taken along the line 5—5 of FIG. 2.

In the embodiment illustrated in FIGS. 1–5, vibration is imparted to the respective slats 13 as they arrive at the downwardly curving portion of the slat path at the discharge end, from a driven shaft 24 having multiple eccentric weights 25 attached either by keys or by friction so that they rotate with the same frequencies as the shaft 24. The shaft 24 is supported in bearing 26 which are in turn supported by bearing pads 27. The bearing pads also support a contact block 28 which bears against the box like portion 15 of each slat at the under side of the respective slats 13. Support of the bearing pads 27 and contact block 28 is by means of a resilient spring 29 which is itself supported by a spring mount bar 30. Support for the spring mount bar 30 is provided by side plates 31 and motor mount 32 by means of pivot bolts or pins 33 which when loosened allow the bar 30 to rotate. A tensioning arm 34 attached to the bar 30, as shown in FIG. 5 enabling the tensioning arm 34 to be moved by a jacking screw 35 or other means to apply pressure to the slats 13 by the bearing pads 27. A locking means 36 consisting of a threaded tee handle, threaded nut or other means secures the tensioning arm 34 in position to produce the desired pressure to the slat.

The driving motor 38 rotates the countershaft 39 by means of pulleys 40 and 41 and belts 42, which in turn cause the eccentric shaft 24 to rotate by means of pulleys 43 and 44 and belt 45.

The motor mount 32 and plate 31 rest on gibs protruding from the frame 18 on either side and are locked in position by clamps 46. Fore and aft adjustment of the contact blocks 28 is accomplished by loosening clamps 46 and rotating the shaft 47 and pinions 48 against rack gears 49. Tensioning screw 35 should be turned to each contact pad pressure while adjustments are made.

Each of the multiple eccentric weights 25 consists of a pair of discs 25a, 25b of equal weight. One disc may be attached to the shaft 24 so that its eccentricity is in phase or at some angle to the eccentricity of the other disc of the pair so that the force or amplitude of vibration may be changed without dismantling or disassembly. This is accomplished by having additional keyways in one disc when a keyway attachment is used. Multiple holes in one disc to match a pin in the other disc of the pair is another method of controlling the magnitude of vibration. Friction attachment of the discs may also be used.

The drive motor 38 may be of the fixed speed type and the optimum rotational speed of the eccentric shaft 24 may be obtained by selection of motor speed and pulley diameters. A preferred means of driving the vibrating discharge device is with a variable speed drive motor with speed variation obtained by mechanical means or by electrically controlling the motor speed.

Figure 6:
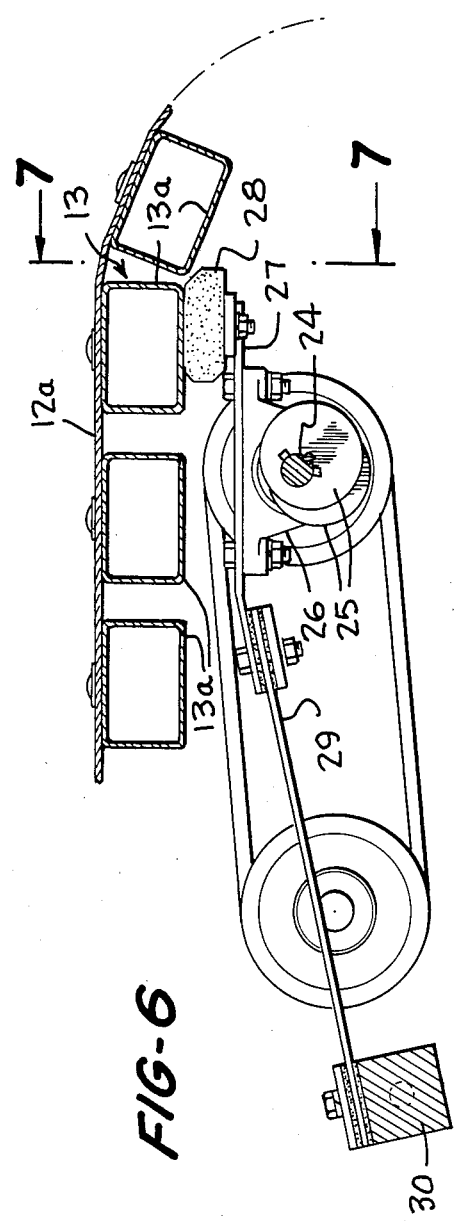
FIG. 6 is a fragmentary section view similar to FIG. 4 but showing an alternative form of a belted slat conveyor.

FIGS. 6 and 7 respectively are a fragmentary somewhat diagrammatical section view of the discharge end portion of the apron and associated vibrating mechanisms to be used with a chain and sprocket drive like that shown in FIGS. 1–3 and are vibration imparting mechanisms very similar to that of FIGS. 1–3, but wherein the slat apron, here indicated at 12a is in the form of widely spaced chain supporting slats 13a formed of rectangular cross section hollow tubular metal slat members 15a covered with the light belt or membrane 50 riveted or otherwise secured near the opposite lateral edges thereof to the slat members 13a. In this version, the components corresponding to those shown in the FIGS. 1–3 version have the same reference characters, which include the multiple eccentric weights 25 on the driven shaft 24, the bearing members 26, the bearing pads 27 and contact blocks, the resilient spring 29, and the spring mounting bar 30. The operation of this version of FIGS. 6 and 7 is the same as that described in connection with FIGS. 1–5, and it should be understood that such a version will also include the adjustment mechanism particularly shown in FIGS. 3 and 5 described in connection with the first version. FIGS. 8 and 9 illustrate another variation of the vibrating discharge device for surge bins, blending bins or the like in which the apron 12b is formed of a fixed support bed 60 of metal, wood or plastic rigidly supported from the bin structure, over which a belt 61 slides, being pulled by a head roller 62. In this case, the bed 60 is discontinued just prior to the head roll 62 and an independent bar 63 is placed in contact with the belt 61 and isolated from but supported by the bin frame 18 by means of vibration isolating the mounts 64. The contact blocks 28 are provided on the spring 29 having bearings 26 supported thereon by which the eccentric disc 25 and shaft 24 are supported for rotation, with the contact blocks 28 bearing against the independent bar 63 in contact with the belt 61. The action is similar to that described in the preceding embodiments, except the positional adjustment is restricted to the extent of the independent bar 63.

The present device is relatively light and essentially isolated from all but a small area of the apron immediately adjacent to the discharge point. In operation, the bearing pads 27 or blocks 28 are located to impart the optimum vibratory action to the associated slat 13 or 13a or the independent bar 63, and the eccentric weights are adjusted to give the optimum vibratory force. The springs 29 are tensioned to produce the best contact pressure between the contact pad and the slat or independent bar. Finally, the speed of vibration is adjusted. Once correctly set these adjustments would only be changed if the stored material required the change.

By the present construction, four adjustments are available. The first is provided by the pinion 48 and rack gear 49 for effecting fore and aft adjustment of the contact blocks 28. The second is provided by the crank arm 36 to change the tension of the spring 29 to maintain the contact, overcoming downward force which otherwise would cause the structure to rattle, be noisy and tend to wear the block out. The third adjustment is the change of the angle of the eccentrics by varying the keyed position of the eccentrics 25 on the shaft 24 or the pins inserted in the plurality of holes in one of each pairs of eccentrics, and the fourth is an adjustment to change the frequency by adjustment of the belt or pulley ratio if a constant speed or motor or adjusting the speed of the variable speed motor if used.

While only a few embodiments of the present invention are specifically shown and described, it will be apparent that other variations will be within the capabilities of persons ordinarily skilled in the art without departing from the scope of our invention as set forth in the appended claims.

We claim:

1. A vibrating discharge apparatus for discharging particulate stored material from a surge or blending bin or the like, comprising a bin forming a receptacle for retaining the material having means defining a storage zone and a discharge end defining a discharge station at one end thereof, a discharge apron defining an upwardly facing apron surface lying in a substantially horizontal plane over most of its length extending along a conveyance path through said storage zone to said discharge end, means at said discharge station directing said discharge apron along a convexly curving discharge end path sloping downwardly from said horizontal plane to discharge the stored material at said discharge end of said apron surface for gravitational discharge of the material downwardly to a material receiving station, said discharge apron comprising a plurality of rigid elongated slat members transversely spanning the apron disposed in parallel cross-wise relation across the apron surface and each having substantially rigid slat body portion and a thin flange-like lip portion projecting therefrom in overlapping abutting relation to the next adjacent slat member when occupying said horizontal plane to define a substantially planiform apron surface, driven chain means at opposite lateral edge portions of the apron trained about sprockets and coupled to the respective slat members for moving the slat members along said horizontal plane, and driven eccentric rotatable impact means having an abutment formation to engage a downwardly facing abutment surface portion of successive slat members as they reach the convexly curving apron path and transfer vibratory movement thereto to assist gravitational discharge of the material therefrom, and support arms for said abutment formation movable to accommodate vibratory movement imparted to the abutment surface portions of said slat members by eccentric means of said impact means, said abutment formation and support arms therefore being formed of an elongated impact bar similar in length and width to said slat body portions arranged parallel to the latter carried on the ends of spring strap arms which are deformable by rotary eccentrics forming the eccentric portion of said impact means to abut and impart vibration to the slat body portions as the latter reach said discharge station.

2. A vibratory discharge apparatus as defined in claim 1, wherein an idler sprocket means and a driven sprocket means are provided at said discharge station and an opposite end of the bin about which said chain means are trained defining an endless belt-type path for said discharge apron.

3. A vibratory discharge apparatus as defined in claim 2, wherein said idler sprocket means is located at said discharge end of the bin adjacent said impact means.

4. A vibratory discharge apparatus as defined in claim 3, wherein said idler sprocket means is formed of two rotatable sprockets adjacent opposite lateral edges of the discharge apron, and said impact means and said abutment formation thereof are located adjacent said discharge end of the bin in the zone between said sprockets.

5. A vibratory discharge apparatus as defined in claim 2, wherein said impact means has a movably mounted support bar for said spring strap arms at an end thereof opposite said impact bar and means for adjusting said support bar along a first adjustment path toward and away from said discharge end to vary selected properties if the vibratory motion imparted to the slat body portions engaged by said impact bar.

6. A vibratory discharge apparatus as defined in claim 3, wherein said impact means has a movably mounted support bar for said spring strap arms at an end thereof opposite said impact bar and means for adjusting said support bar along a first adjustment path toward and away from said discharge end to vary selected properties if the vibratory motion imparted to the slat body portions engaged by said impact bar.

7. A vibratory discharge apparatus as defined in claim 4, wherein said impact means has a movably mounted support bar for said spring strap arms at an end thereof opposite said impact bar and means for adjusting said support bar along a first adjustment path toward and away from said discharge end to vary selected properties if the vibratory motion imparted to the slat body portions engaged by said impact bar. imparted to the slat body portions engaged by said impact bar.

8. A vibratory discharge apparatus as defined in claim 2, wherein said impact means has a movably mounted support bar for said spring strap arms at an end thereof opposite said impact bar and means for adjusting said support bar along a first adjustment path toward and away from said discharge end and for adjusting the support bar along a second adjustment path extending substantially normal to said first adjustment path to vary selected properties if the vibratory motion imparted to the slat body portions engaged by said impact bar 9. A vibratory discharge apparatus as defined in claim 8, wherein the eccentric portion of said impact means comprises a driven rotatable shaft and plural eccentric member pairs mounted thereon and adjustable circumferentially for varying the frequency of vibration imparted to said impact means.

10. A vibratory discharge apparatus as defined in claim 3, wherein said impact means has a movably mounted support bar for said spring strap arms at an end thereof opposite said impact bar and means for adjusting said support bar along a first adjustment path toward and away from said discharge end and for adjusting the support bar along a second adjustment path extending substantially normal to said first adjustment path to vary selected properties if the vibratory motion imparted to the slat body portions engaged by said impact bar.

11. A vibratory discharge apparatus as defined in claim 10, wherein the eccentric portion of said impact means comprises a driven rotatable shaft and plural eccentric member pairs mounted thereon and adjustable circumferentially for varying the frequency of vibration imparted to said impact means.

12. A vibratory discharge apparatus as defined in claim 4, wherein said impact means has a movably mounted support bar for said spring strap arms at an end thereof opposite said impact bar and means for adjusting said support bar along a first adjustment path toward and away from said discharge end and for adjusting the support bar along a second adjustment path extending substantially normal to said first adjustment path to vary selected properties if the vibratory motion imparted to the slat body portions engaged by said impact bar.

13. A vibratory discharge apparatus as defined in claim 12, wherein the eccentric portion of said impact means comprises a driven rotatable shaft and plural eccentric member pairs mounted thereon and adjustable circumferentially for varying the frequency of vibration imparted to said impact means.

14. A vibratory discharge apparatus as defined in claim 2, wherein said slat members each comprise a rectangular cross-section tube having parallel top and bottom walls when occupying said horizontal plane with said walls joining front and rear side walls at the upper and lower edges of the latter and the top wall being wider than said bottom wall leaving said flange-like lip portion projecting beyond said front side wall toward said discharge end.

15. A vibratory discharge apparatus as defined in claim 4, wherein said slat members each comprise a rectangular cross-section tube having parallel top and bottom walls when occupying said horizontal plane with said walls joining front and rear side walls at the upper and lower edges of the latter and the top wall being wider than said bottom wall leaving said flange-like lip portion projecting beyond said front side wall toward said discharge end.

16. A vibratory discharge apparatus as defined in claim 1, wherein said impact means has a movably mounted support bar for said spring strap arms at an end thereof opposite said impact bar and means for adjusting said support bar along a first adjustment path toward and away from said discharge end to vary selected properties if the vibratory motion imparted to the slat body portions engaged by said impact bar.

17. A vibratory discharge apparatus as defined in claim 16, wherein said slat members each comprise a rectangular cross-section tube having parallel top and bottom walls when occupying said horizontal plane with said walls joining front and rear side walls at the upper and lower edges of the latter and the top wall being wider than said bottom wall leaving said flange-like lip portion projecting beyond said front side wall toward said discharge end.

18. A vibratory discharge apparatus as defined in claim 1 wherein said impact means has a movably mounted support bar for said spring strap arms at an end thereof opposite said impact bar and means for adjusting said support bar along a first adjustment path toward and away from said discharge end and for adjusting the support bar along a second adjustment path extending substantially normal to said first adjustment path to vary selected properties if the vibratory motion imparted to the slat body portions engaged by said impact bar.

19. A vibratory discharge apparatus as defined in claim 18, wherein the eccentric portion of said impact means comprises a driven rotatable shaft and plural eccentric member pairs mounted thereon and adjustable circumferentially for varying the frequency of vibration imparted to said impact means.

20. A vibratory discharge apparatus as defined in claim 18, wherein said slat members each comprise a rectangular cross-section tube having parallel top and bottom walls when occupying said horizontal plane with said walls joining front and rear side walls at the upper and lower edges of the latter and the top wall being wider than said bottom wall leaving said flange-like lip portion projecting beyond said front side wall toward said discharge end.

21. A vibratory discharge apparatus as defined in claim 1, wherein said slat members each comprise a rectangular cross-section tube having parallel top and bottom walls when occupying said horizontal plane with said walls joining front and rear side walls at the upper and lower edges of the latter and the top wall being wider than said bottom wall leaving said flange-like lip portion projecting beyond said front side wall toward said discharge end.

* * * * *